UNITED STATES PATENT OFFICE.

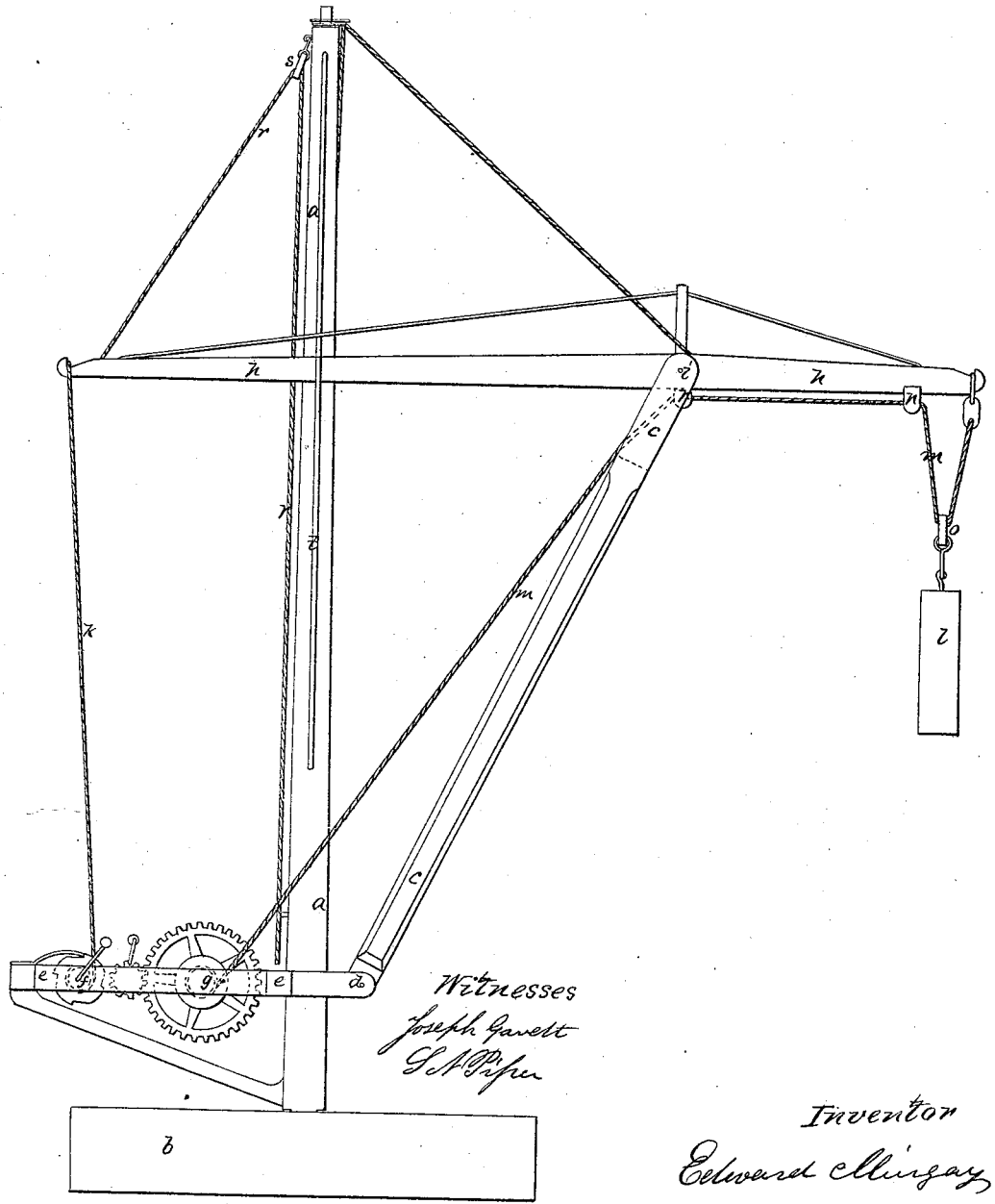

EDWARD MINGAY, OF BOSTON, MASSACHUSETTS.

IMPROVEMENT IN DERRICKS.

Specification forming part of Letters Patent No. 13,269, dated July 17, 1855.

*To all whom it may concern:*

Be it known that I, EDWARD MINGAY, of Boston, in the county of Suffolk and State of Massachusetts, have invented certain new and useful Improvements in Derricks; and I do hereby declare that the following description, taken in connection with the accompanying drawing, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The accompanying drawing, which is a side elevation of the derrick, represents my improvements.

My improvements consist in so applying a lever to the derrick as to elevate the weight or load to be raised with much greater ease and much quicker than by the mode ordinarily employed.

In my improved derrick a lever is attached to and has its fulcrum in the swinging boom of the derrick and the weight is raised by the combined action of the said lever and by ropes and pulleys actuated by a separate windlass.

$a\ a$ in the accompanying drawing represent the mast of the derrick turning upon a journal in the platform $b$.

$c\ c$ is the swinging boom having a fulcrum at $d$ in the frame $e\ e$, in which are two windlasses $f$ and $g$.

$h\ h$ is a lever having its fulcrum at $i$ in the upper end of the boom $c\ c$.

$k$ is a rope attached to the end of the long arm of the lever and is wound up by the windlass $f$.

The weight is represented at $l$, and is attached to the short arm of the lever $h\ h$ by a rope $m\ m$, which passes through the blocks or pulleys $n\ o$, and the pulley $p$, inserted in the upper end of the boom $c\ c$, and is wound upon the windlass $g$. Thus by winding up the rope $k$ by turning the windlass $f$ the long arm of the lever $h\ h$ will be depressed, and the weight $l$ quickly and easily elevated, while at the same time the windlass $g$, being operated, also assists in raising the weights through its draft-rope and pulleys, as will be readily understood by inspection of the drawing. After the weight has been raised and conveyed to the desired locality, the longer arm of the lever $h\ h$ can be elevated to its former position by a rope $r\ r$ passing through a pulley $s$, attached to the mast-head. The long arm of the lever is guided and kept in position laterally while being raised or lowered by a guiding-rod $t$.

Having thus described my improvements, I shall state my claim, as follows:

What I claim as my invention, and desire to have secured to me by Letters Patent, is—

Attaching to a derrick a lever having its fulcrum in the boom of the same and actuated by a rope and windlass, substantially as hereinabove described.

EDWARD MINGAY.

Witnesses:
JOSEPH GAVETT,
S. N. PIPER.